US010390245B2

(12) United States Patent
Narasimha et al.

(10) Patent No.: US 10,390,245 B2
(45) Date of Patent: Aug. 20, 2019

(54) ENHANCED MEASUREMENTS IN A WIRELESS COMMUNICATION SYSTEM

(71) Applicant: MOTOROLA MOBILITY LLC, Chicago, IL (US)

(72) Inventors: Murali Narasimha, Vernon Hills, IL (US); Ravikiran Nory, Buffalo Grove, IL (US)

(73) Assignee: Motorola Mobility LLC, Chicago, IL (US)

( * ) Notice: Subject to any disclaimer, the term of this patent is extended or adjusted under 35 U.S.C. 154(b) by 140 days.

(21) Appl. No.: 14/883,653

(22) Filed: Oct. 15, 2015

(65) Prior Publication Data

US 2017/0094543 A1 Mar. 30, 2017

Related U.S. Application Data

(60) Provisional application No. 62/233,086, filed on Sep. 25, 2015.

(51) Int. Cl.
*H04W 24/10* (2009.01)
*H04L 12/26* (2006.01)
*H04L 12/807* (2013.01)
*H04W 16/14* (2009.01)
*H04B 17/318* (2015.01)
*H04L 5/00* (2006.01)
*H04B 17/336* (2015.01)
(Continued)

(52) U.S. Cl.
CPC .......... *H04W 24/10* (2013.01); *H04B 17/318* (2015.01); *H04L 43/16* (2013.01); *H04L 47/27* (2013.01); *H04W 16/14* (2013.01); *H04B 17/336* (2015.01); *H04B 17/373* (2015.01); *H04B 17/382* (2015.01); *H04L 5/0048* (2013.01); *H04L 5/0091* (2013.01)

(58) Field of Classification Search
CPC .. H04B 17/318; H04B 17/336; H04B 17/373; H04B 17/382; H04L 43/16; H04L 47/27; H04L 5/001; H04L 5/0048; H04W 16/14; H04W 24/10; H04W 72/0446; H04W 72/0453; H04W 74/0808
USPC ........................................................ 370/252
See application file for complete search history.

(56) References Cited

U.S. PATENT DOCUMENTS 8,824,973 B2 * 9/2014 Kleinhenz ............. H04L 1/0026
455/277.2
9,603,084 B2 * 3/2017 Kim ...................... H04W 48/16
(Continued)

OTHER PUBLICATIONS

ETSI MCC: Report of 3GPP TSG RAN WG2 meeting #90, 3GPP TSG-RAN Working Group 2 meeting #91, R2-153060, Beijing China, Aug. 24-28, 2015, all pages.
(Continued)

*Primary Examiner* — Un C Cho
*Assistant Examiner* — Shah M Rahman
(74) *Attorney, Agent, or Firm* — Kunzler Bean & Adamson

(57) ABSTRACT

Apparatuses, methods, and systems are disclosed for enhanced measurements. One method includes performing, by use of a processor, a first measurement at a first time. The method includes determining an offset time selected pseudo-randomly from a set of values. The method includes performing a second measurement at a second time, the second time being the offset time after the first time. The second measurement is used for a carrier loading measurement.

25 Claims, 12 Drawing Sheets

(51) Int. Cl.
*H04B 17/373* (2015.01)
*H04B 17/382* (2015.01)

(56) References Cited

U.S. PATENT DOCUMENTS

| | | | |
|---|---|---|---|
| 9,998,936 B2 | 6/2018 | Narasimha et al. | |
| 2010/0279638 A1* | 11/2010 | Lindoff | H04L 25/0204 455/226.1 |
| 2011/0007657 A1* | 1/2011 | Kazmi | H04J 11/0093 370/252 |
| 2012/0115463 A1* | 5/2012 | Weng | H04L 1/0026 455/425 |
| 2012/0213107 A1* | 8/2012 | Jang | H04W 24/10 370/252 |
| 2012/0214541 A1* | 8/2012 | Narasimha | H04L 5/001 455/525 |
| 2012/0244903 A1* | 9/2012 | Fong | H04W 8/20 455/517 |
| 2012/0264476 A1* | 10/2012 | Kleinhenz | H04L 1/0026 455/517 |
| 2013/0208604 A1* | 8/2013 | Lee | H04L 25/0226 370/252 |
| 2014/0105042 A1* | 4/2014 | Cui | H04W 24/00 370/252 |
| 2014/0226506 A1* | 8/2014 | Sadek | H04J 3/1694 370/252 |
| 2014/0256336 A1* | 9/2014 | Manssour | H04L 1/0026 455/450 |
| 2014/0302865 A1 | 10/2014 | Bai et al. | |
| 2014/0362720 A1* | 12/2014 | Kim | H04B 7/024 370/252 |
| 2015/0119039 A1* | 4/2015 | Virtej | H04W 24/10 455/436 |
| 2015/0223245 A1* | 8/2015 | Cheng | H04W 48/16 370/329 |
| 2015/0312789 A1* | 10/2015 | You | H04L 1/0693 370/252 |
| 2016/0073265 A1* | 3/2016 | Vutukuri | H04W 12/06 455/411 |
| 2016/0198373 A1* | 7/2016 | Thangarasa | H04W 36/0088 455/436 |
| 2016/0205499 A1* | 7/2016 | Davydov | H04W 4/02 455/456.1 |
| 2016/0278078 A1* | 9/2016 | Cheng | H04W 72/0446 |
| 2016/0302230 A1* | 10/2016 | Novlan | H04B 17/318 |
| 2016/0330641 A1* | 11/2016 | Zhang | H04W 24/02 |
| 2016/0338118 A1* | 11/2016 | Vajapeyam | H04B 17/318 |
| 2016/0381600 A1* | 12/2016 | Aksu | H04W 28/08 455/453 |
| 2017/0048690 A1* | 2/2017 | Yang | H04W 16/14 |
| 2017/0070312 A1* | 3/2017 | Yi | H04J 11/0069 |
| 2017/0085326 A1* | 3/2017 | Li | H04B 17/345 |
| 2017/0093508 A1* | 3/2017 | Martin | H04B 17/318 |
| 2017/0126357 A1* | 5/2017 | Dalsgaard | H04L 1/0026 |
| 2017/0181019 A1* | 6/2017 | Yi | H04W 24/08 |
| 2017/0215097 A1* | 7/2017 | Park | H04W 24/08 |
| 2017/0238320 A1* | 8/2017 | Fukuta | H04W 16/14 370/329 |
| 2017/0245168 A1* | 8/2017 | Yi | H04W 24/10 |
| 2018/0175975 A1* | 6/2018 | Um | H04L 1/1816 |
| 2018/0213561 A1* | 7/2018 | Bhorkar | H04L 5/005 |

OTHER PUBLICATIONS

3GPP TS 36.331 V12.7.0, "3rd Generation Partnership Project; Technical Specification Group Radio Access Network; Evolved Universal Terrestrial RAdio Access (E-UTRA); Radio Resource Control (RRC); Protocol specification (Release12)", (Sep. 2015), all pages.

3GPP TS36.133 V13.1.0, "3rd Generation Partnership Project; Technical Specification Group Radio Access Network; Evolved Universal Terrestrial Radio Access (E-UTRA); Requirements for support of radio resource management (Release 13)", (Sep. 2015), all pages.

3GPP TS 36.214 V12.2.0, "3rd Generation Partnership Project; Technical Specification Group Radio Access Network; Evolved Universal Terrestrial Radio Access (E-UTRA); Physical layer; Measurements (Release 12)", (Mar. 2015), alL pages.

U.S. Appl. No. 14/883,654, Office Action Summary, dated Sep. 26, 2017.

PCT/US2016/047987, International Search Report, dated Oct. 17, 2016, pp. 1-4.

PCT/US2016/047987, Written Opinion of the International Searching Authority, dated Oct. 17, 2016, pp. 1-7.

Motorola Solutions, "RSRQ Measurement Restriction Configurations for eICIC", 3GPP TSG RAN WG2 #72b, R2-110476, Jan. 17-21, 2011, pp. 1-4.

Samsung, LAA RSSI Measurement, 3GPP TSG RAN SG1 Meeting #82, R1-154145, Aug. 24-28, 2015, pp. 1-5.

* cited by examiner

ENHANCED MEASUREMENTS IN A WIRELESS COMMUNICATION SYSTEM

CROSS-REFERENCES TO RELATED APPLICATIONS

This application claims priority to United States Provisional Patent Application No. 62/233,086 entitled "ENHANCED MEASUREMENTS AND FILTERS IN A WIRELESS COMMUNICATION SYSTEM" and filed on Sep. 25, 2015 which is incorporated herein by reference in its entirety.

FIELD

The subject matter disclosed herein relates generally to wireless communications and more particularly relates to enhanced measurements and filters in a wireless communication system.

BACKGROUND

The following abbreviations are herewith defined, at least some of which are referred to within the following description.
3GPP Third Generation Partnership Project
ACK Positive-Acknowledgment
BLER Block Error Ratio
BPSK Binary Phase Shift Keying
C-RNTI Cell Radio Network Temporary Identifier
CAZAC Constant Amplitude Zero Auto Correction
CCA Clear Channel Assessment
CCE Control Channel Element
CDF Cumulative Distribution Function
CP Cyclic Prefix
CQI Channel Quality Information
CSI Channel State Information
CSS Common Search Space
CWS Contention Window Size
DCI Downlink Control Information
DL Downlink
DMTC Discover Signal Measurement Timing Configuration
DRX Discontinuous Reception
eCCA Enhanced Clear Channel Assessment
eNB Evolved Node B
EPDCCH Enhanced Physical Downlink Control Channel
ETSI European Telecommunications Standards Institute
FBE Frame Based Equipment
FDD Frequency Division Duplex
FDMA Frequency Division Multiple Access
FEC Forward Error Correction
HARQ Hybrid Automatic Repeat Request
LAA Licensed Assisted Access
LAA-RSSI Licensed Assisted Access Received Signal Strength Indicator
LBE Load Based Equipment
LBT Listen-Before-Talk
LTE Long Term Evolution
MAC Medium Access Control
MCL Minimum Coupling Loss
MCS Modulation and Coding Scheme
MU-MIMO Multi-User, Multiple-Input, Multiple-Output
NACK or NAK Negative-Acknowledgment
OFDM Orthogonal Frequency Division Multiplexing
PCell Primary Cell
PCID Physical Cell ID
PBCH Physical Broadcast Channel
PDCCH Physical Downlink Control Channel
PDSCH Physical Downlink Shared Channel
PHICH Physical Hybrid ARQ Indicator Channel
PLMN Public Land Mobile Network
PRACH Physical Random Access Channel
PRB Physical Resource Block
PUCCH Physical Uplink Control Channel
PUSCH Physical Uplink Shared Channel
RNTI Radio Network Temporary Identifier
QoS Quality of Service
QPSK Quadrature Phase Shift Keying
RAR Random Access Response
RRC Radio Resource Control
RRM Radio Resource Management
RSRP Reference Signal Received Power
RSRQ Reference Signal Received Quality
RSSI Received Signal Strength Indicator
RX Receive
SC-FDMA Single Carrier Frequency Division Multiple Access
SCell Secondary Cell
SCH Shared Channel
SFN System Frequency Number
SIB System Information Block
SNR Signal-to-Interference-Plus-Noise Ratio
SR Scheduling Request
TBS Transport Block Size
TDD Time-Division Duplex
TDM Time Division Multiplex
TX Transmit
UCI Uplink Control Information
UE User Entity/Equipment (Mobile Terminal)
UL Uplink
UMTS Universal Mobile Telecommunications System
VoIP Voice Over Internet Protocol
WiMAX Worldwide Interoperability for Microwave Access In wireless communications networks, LAA facilitates an LTE system to use an unlicensed spectrum with assistance from a licensed carrier. LAA further aims to facilitate the fair coexistence with other technologies over the unlicensed spectrum and to satisfy various regulatory requirements in different countries and regions. In certain configurations, LAA operations may depend heavily on the LBT procedure. For example, if a channel is occupied, an eNB cannot transmit on that channel.

As may be appreciated, if a carrier has a significant amount of activity from other nodes (e.g., Wi-Fi, LAA, etc.) transmissions may be delayed. The delay of transmissions may apply to all transmissions including discovery signal transmissions, which are used for RRM measurements. The unpredictability of discovery signal transmissions may lead to various problems.

For example, RSRP measurements for LAA may be performed based on measurements of discovery signals. In one embodiment, a UE is provided a DMTC configuration, from which the UE derives time windows during which it expects to detect a discovery signal transmission. However, transmissions of discovery signals may be subject to the LBT procedure. Thus, if the channel is occupied, during the DMTC window, the discovery signal transmission is delayed or skipped. It should be noted that the DMTC window may be kept small to ensure that the UE power consumption for detecting and measuring the discovery signals remains manageable. If a discovery signal transmission is skipped or delayed, the UE physical layer may not provide a corresponding physical layer measurement to RRC.

A delay or skip in discovery signal transmissions by an eNB implies a delay in RSRP measurement samples by a UE. In various configurations, the UE may perform layer 3 filtering of physical layer RSRP measurements. The layer 3 filtering in LTE assumes that a measurement sample is made available at least once every 200 milliseconds ("ms"). If a discovery signal is considerably delayed, channel conditions may have changed significantly by the time the discovery signal is actually transmitted. However, a history in a layer 3 filter may cause the convergence of the filtered measurements to the new channel conditions to be slow.

Furthermore, RSRP measurements may not give a clear picture of activity on a carrier. In certain configurations, a UE may find a carrier that has a desired LAA cell (e.g., belonging to desired PLMN) and measure a high RSRP for the cell. On a different carrier the UE may find a desired LAA cell and measure a moderate RSRP for the cell. Based on the current measurement framework, the first cell would be chosen for LAA service. However, if the first carrier has a significantly higher level of activity/channel occupancy compared to the second carrier, the throughput that can be achieved on the first cell may be lower than the throughput that can be achieved on the second cell. Moreover, for certain types of services (e.g., VoIP and other periodic packet arrival services) a carrier with low occupancy may be preferred.

BRIEF SUMMARY

Apparatuses for enhanced measurements and filters are disclosed. Methods and systems also perform the functions of the apparatus. In one embodiment, the apparatus includes a receiver that detects a reference signal during a first time window of a set of time windows during which reception of the reference signal is expected and detects the reference signal during a second time window of the set of time windows. In various embodiments, the second time window occurs an offset time after the first time window. In some embodiments, the apparatus includes a processor that determines a filter coefficient based on the offset time. In such embodiments, the filter coefficient is used to generate a filtered measurement.

In one embodiment, the offset time includes one or more time windows of the set of time windows during which the reference signal is not detected. In a further embodiment, the processor determines the filter coefficient by summing a predetermined filter coefficient and a parameter derived as a function of the offset time. In some embodiments, the processor determines the filter coefficient to be a first value if the offset time is less than a threshold time and to be a second value if the offset time is greater than or equal to the threshold time.

A method for enhanced measurements and filters, in one embodiment, includes detecting, by use of a receiver, a reference signal during a first time window of a set of time windows during which reception of the reference signal is expected. In various embodiments, the method may include detecting the reference signal during a second time window of the set of time windows. In such embodiments, the second time window occurs an offset time after the first time window. In some embodiments, the method includes determining a filter coefficient based on the offset time. In such embodiments, the filter coefficient is used to generate a filtered measurement.

In one embodiment, the offset time includes one or more time windows of the set of time windows during which the reference signal is not detected. In a further embodiment, determining the filter coefficient based on the offset time includes determining the filter coefficient by summing a predetermined filter coefficient and a parameter derived as a function of the offset time. In some embodiments, determining the filter coefficient based on the offset time includes determining the filter coefficient to be a first value if the offset time is less than a threshold time and to be a second value if the offset time is greater than or equal to the threshold time.

Another method for enhanced measurements and filters, in one embodiment, includes performing, by use of a processor, a first measurement at a first time. In various embodiments, the method may include determining an offset time selected pseudo-randomly from a set of values. In some embodiments, the method includes performing a second measurement at a second time, the second time being the offset time after the first time. In such embodiments, the second measurement is used for a carrier loading measurement.

In certain embodiments, determining the offset time selected pseudo-randomly from the set of values includes determining the offset time based on at least one of a subframe index, a system frame number, a cell radio network temporary identifier ("C-RNTI"), a physical cell id, a virtual cell id, and a scrambling sequence initialization value. In some embodiments, determining the offset time selected pseudo-randomly from the set of values includes determining the offset time based on a modulo function with at least one of the following inputs: a subframe index, a system frame number, a cell radio network temporary identifier ("C-RNTI"), a physical cell id, a virtual cell id, and a scrambling sequence initialization value.

In one embodiment, an apparatus includes a receiver that receives information. In various embodiments, the apparatus may include a processor that performs a first measurement in a first set of subframes received by the receiver at a first time. In such embodiments, the first set of subframes includes at least one subframe. In some embodiments, the processor performs a second measurement in a second set of subframes received by the receiver at a second time. In such embodiments, the second set of subframes includes at least one subframe. In various embodiments, the second set of subframes is offset in time from the first set of subframes by an offset time, the offset time being determined using a pseudo-random function.

In various embodiments, the pseudo-random function determines the offset time based on at least one of a subframe index, a system frame number, a cell radio network temporary identifier ("C-RNTI"), a physical cell id, a virtual cell id, and a scrambling sequence initialization value. In one embodiment, the first measurement is a reference signal received power ("RSRP") measurement and the second measurement is a carrier loading measurement. In certain embodiments, the first measurement occurs in a discovery signal measurement timing configuration ("DMTC") time window and the second measurement occurs outside of a DMTC time window.

Another method for enhanced measurements and filters, in one embodiment, includes performing, by use of a processor, a first measurement in a first set of subframes at a first time. In such an embodiment, the first set of subframes includes at least one subframe. In various embodiments, the method includes performing a second measurement in a second set of subframes at a second time. In such embodiments, the second set of subframes includes at least one subframe. In various embodiments, the second set of subframes is offset in time from the first set of subframes by an offset time, the offset time being determined using a pseudo-random function.

In one embodiment, the pseudo-random function determines the offset time based on at least one of a subframe index, a system frame number, a cell radio network temporary identifier ("C-RNTI"), a physical cell id, a virtual cell id, and a scrambling sequence initialization value. In another embodiment, the first measurement is a reference signal received power ("RSRP") measurement and the second measurement is a carrier loading measurement. In some embodiments, the first measurement occurs in a discovery signal measurement timing configuration ("DMTC") time window and the second measurement occurs outside of a DMTC time window.

In one embodiment, an apparatus includes a receiver that receives information corresponding to load measurements made by a device. In such an embodiment, wherein the load measurements include a first measurement in a first set of subframes at a first time, wherein the first set of subframes include at least one subframe, a second measurement in a second set of subframes at a second time, wherein the second set of subframes include at least one subframe, and wherein the second set of subframes is offset in time from the first set of subframes by an offset time, the offset time being determined using a pseudo-random function. In various embodiments, the apparatus includes a processor that determines carriers to be used based on the information.

In certain embodiments, the first measurement is a reference signal received power ("RSRP") measurement and the second measurement is a carrier loading measurement. In some embodiments, the first measurement occurs in a discover signal measurement timing configuration ("DMTC") time window and the second measurement occurs outside of a DMTC time window.

A further method for enhanced measurements and filters, in one embodiment, includes receiving, by use of a receiver, information corresponding to load measurements made by a device. In such an embodiment, the load measurements include a first measurement in a first set of subframes at a first time, wherein the first set of subframes include at least one subframe, a second measurement in a second set of subframes at a second time, wherein the second set of subframes include at least one subframe, and wherein the second set of subframes is offset in time from the first set of subframes by an offset time, the offset time being determined using a pseudo-random function. In various embodiments, the method includes determining carriers to be used based on the information.

In certain embodiments, the first measurement is a reference signal received power ("RSRP") measurement and the second measurement is a carrier loading measurement. In some embodiments, the first measurement occurs in a discover signal measurement timing configuration ("DMTC") time window and the second measurement occurs outside of a DMTC time window.

Another method for enhanced measurements and filters, in one embodiment, includes receiving, by use of a receiver, a discovery signal measurement timing configuration ("DMTC") from higher layer signaling. In various embodiments, the method includes determining a set of periodic DMTC time windows from the received DMTC, wherein each periodic DMTC time window of the set of periodic DMTC time windows includes a set of contiguous subframes. In one embodiment, the method includes determining a set of carrier loading measurement time windows, wherein each carrier loading measurement time window of the set of carrier loading measurement time windows includes a set of contiguous subframes. In certain embodiments, the method includes measuring carrier loading in at least one subframe in each carrier loading measurement time window of the set of carrier loading measurement time windows. In one embodiment, each carrier loading measurement time window of the set of the carrier loading measurement time windows occur immediately adjacent in time to a respective periodic DMTC time window of the set of periodic DMTC time windows and each carrier loading measurement time window does not overlap its respective periodic DMTC time window.

In one embodiment, the method includes measuring at least one of reference signal received power ("RSRP") and reference signal received quality ("RSRQ") in at least one subframe of each periodic DMTC time window of the set of periodic DMTC time windows. In various embodiments, each carrier loading measurement time window of the set of carrier loading measurement time windows is a periodic carrier loading measurement time window. In some embodiments, a carrier loading measurement time window periodicity is a multiple of a DMTC time window periodicity.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
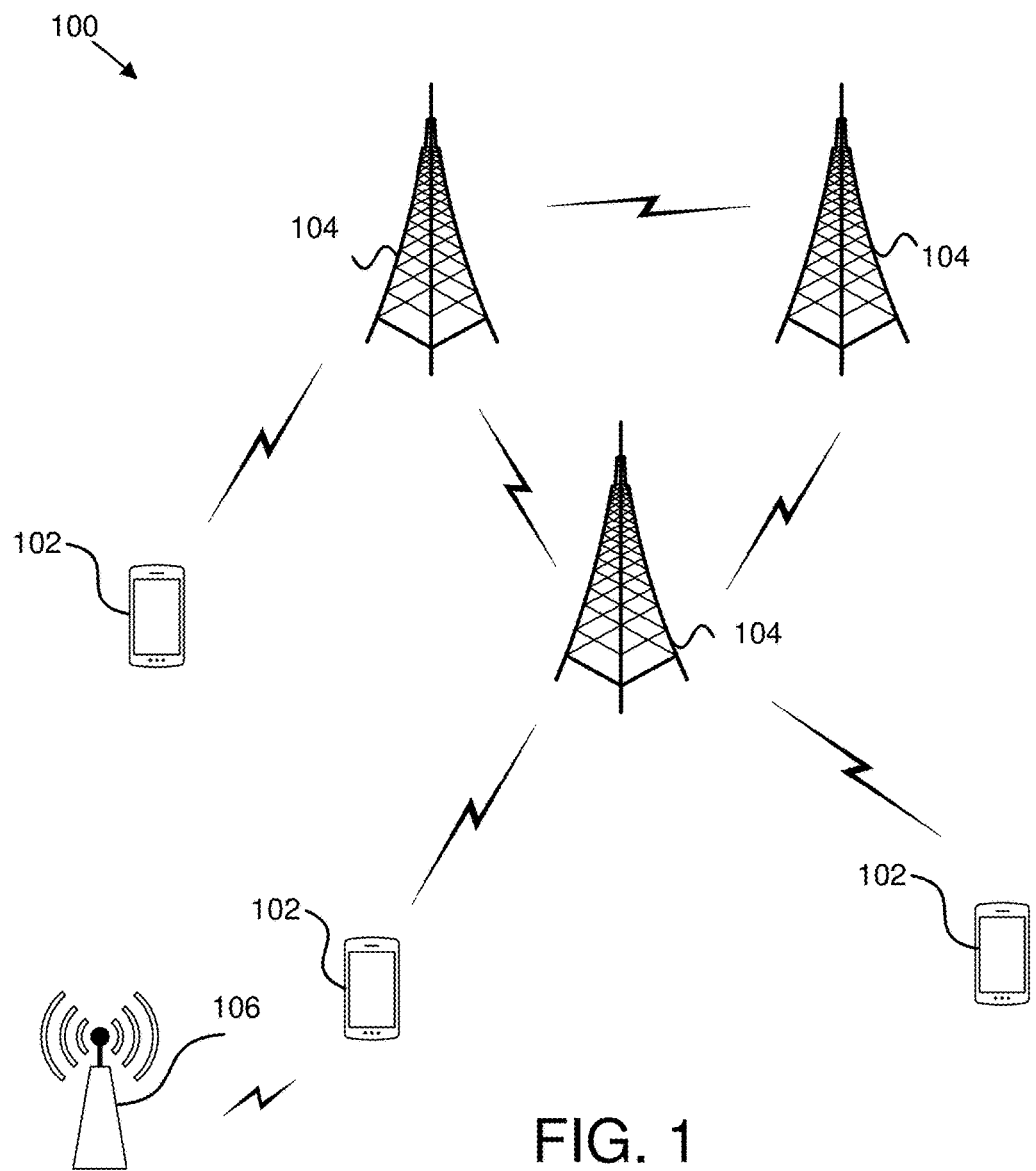
FIG. 1 is a schematic block diagram illustrating one embodiment of a wireless communication system for enhanced measurements and filters.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for enhanced measurements and filters. In one embodiment, the wireless communication system 100 includes remote units 102, base units 104, and unlicensed carriers 106. Even though a specific number of remote units 102, base units 104, and unlicensed carriers 106 are depicted in FIG. 1, one of skill in the art will recognize that any number of remote units 102, base units 104, and unlicensed carriers 106 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain. The unlicensed carriers 106 may be any suitable unlicensed carrier, such as a Wi-Fi access point ("AP"). The unlicensed carriers 106 may communicate with one or more of the remote units 102.

In certain embodiments, a remote unit 102 (e.g., device) may detect a reference signal during a first time window of a set of time windows during which reception of the reference signal is expected and detect the reference signal during a second time window of the set of time windows. The second time window may occur an offset time after the first time window. The remote unit 102 may also determine a filter coefficient based on the offset time. The filter coefficient may be used to generate a filtered measurement. Accordingly, the filtered measurement may be more suitable for operation than in configurations that do not change the filter coefficient based on the offset time.

In one embodiment, a remote unit 102 (e.g., device) may perform a first measurement at a first time. The remote unit 102 may determine an offset time selected pseudo-randomly from a set of values. As may be appreciated, pseudo-random may refer to something that appears random, but is not. For example, pseudo-random sequences may exhibit statistical randomness but are generated by an entirely deterministic causal process. Moreover, the remote unit 102 may perform a second measurement at a second time, the second time being the offset time after the first time. The second measurement may be used for a carrier loading measurement. A base unit 104 (e.g., device) may receive the information from the remote unit 102 corresponding to load measurements and may determine carriers to be used based on the information.

Figure 2:
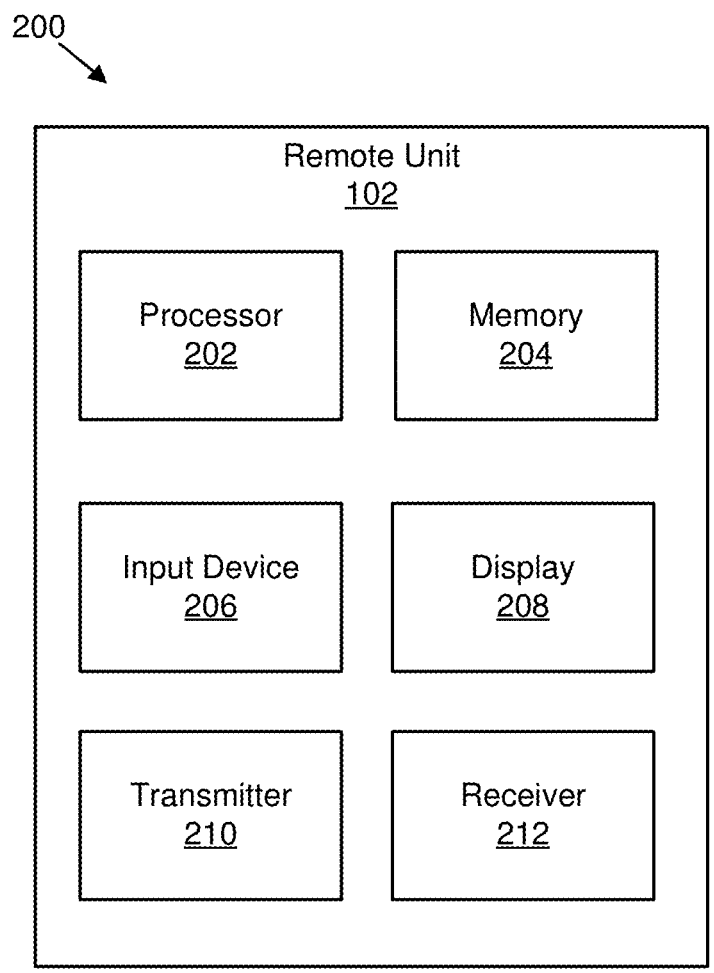
FIG. 2 is a schematic block diagram illustrating one embodiment of an apparatus that may be used for enhanced measurements and filters.

FIG. 2 depicts one embodiment of an apparatus 200 that may be used for enhanced measurements and filters. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212. In certain embodiments, the processor 202 may determine a filter coefficient based on an offset time, wherein the filter coefficient is used to generate a filtered measurement. In some embodiments, the processor 202 may perform a first measurement in a first set of subframes received by a receiver at a first time and may perform a second measurement in a second set of subframes received by the receiver at a second time.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to filter coefficients, configuration information, and so forth. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In one embodiment, the transmitter 210 is used to transmit load information to the base unit 104. In certain embodiments, the receiver 212 may be used to detect a reference signal and/or to receive information. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
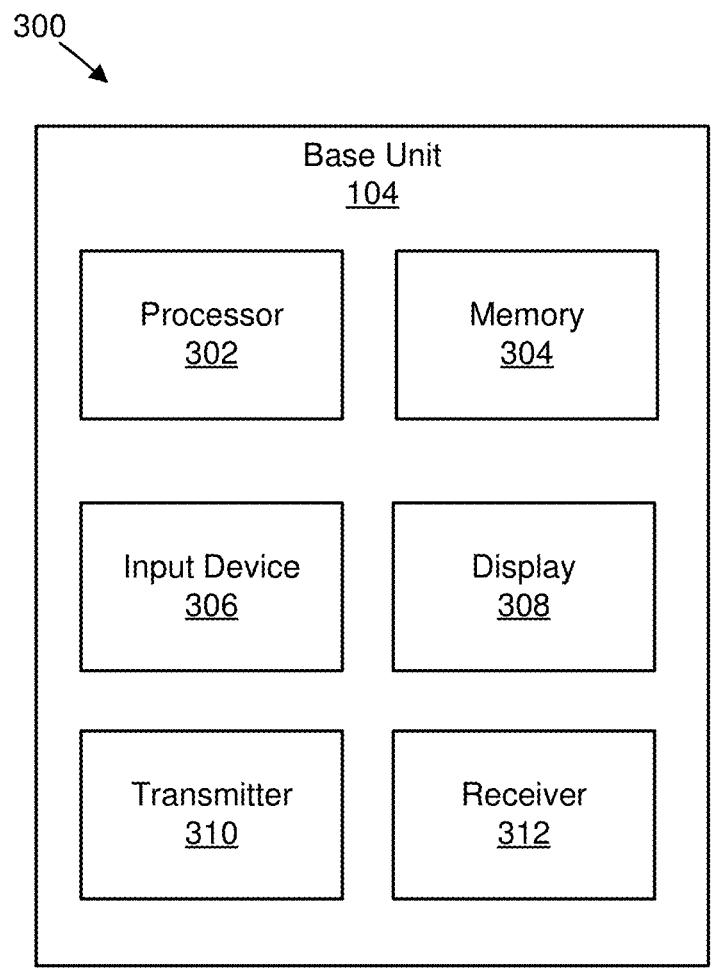
FIG. 3 is a schematic block diagram illustrating another embodiment of an apparatus that may be used for enhanced measurements and filters.

FIG. 3 depicts another embodiment of an apparatus 300 that may be used for enhanced measurements and filters. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, and the display 308 may be substantially similar to the processor 202, the memory 204, the input device 206, and the display 208 of the remote unit 102, respectively. In certain embodiments, the processor 302 may be used to determine carriers to be used based on information received from a remote unit 102.

The transmitter 310 is used to provide DL communication signals to the remote unit 102 and the receiver 312 is used to receive UL communication signals from the remote unit 102. In one embodiment, the receiver 312 is used to receive information corresponding to load measurements from one or more remote units 102. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
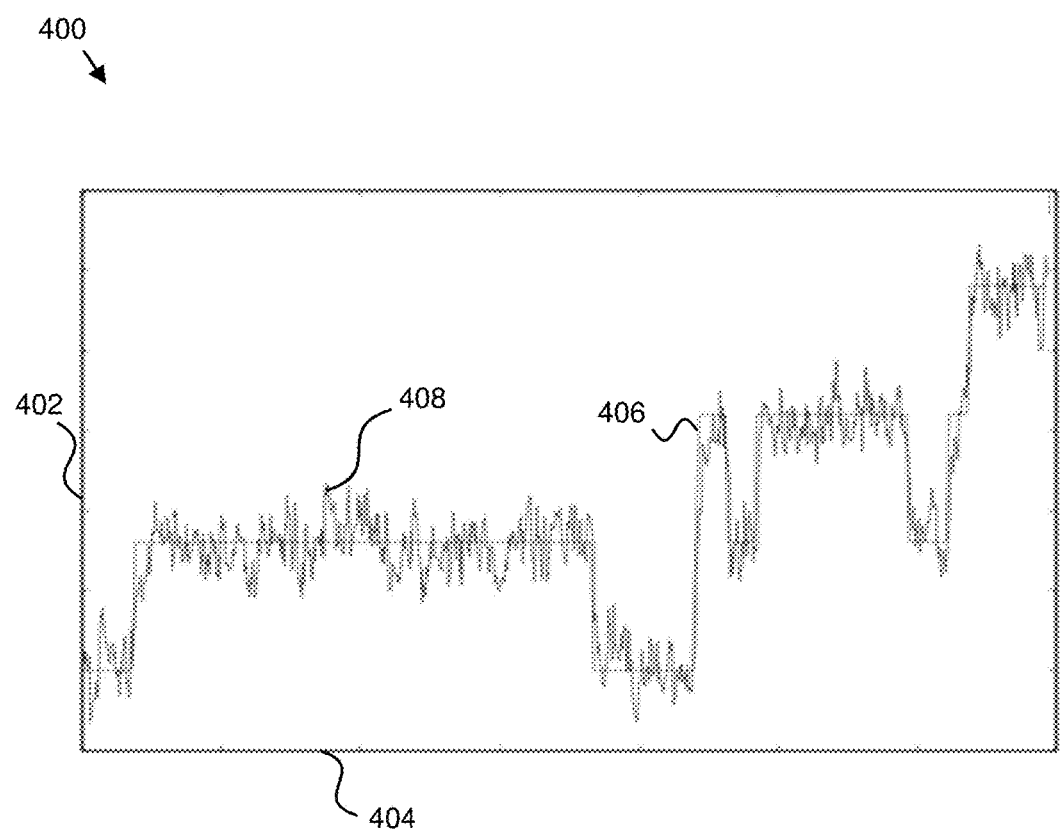
FIG. 4 illustrates a graph of one embodiment of layer 3 filtering.

FIG. 4 illustrates a graph 400 of one embodiment of layer 3 filtering. In the illustrated embodiment, RSRP 402 in the y-axis is illustrated over time 404 in the x-axis. Specifically, a mean RSRP 406 and a filtered RSRP 408 are illustrated over time 404. The filtered RSRP 408 is calculated using the following formula: $F_n=(1-\alpha)F_{n-1}+\alpha M_2$ where M is the latest received measurement result (e.g., measured RSRP) from the physical layer; $F_n$ is the updated filtered measurement result (e.g., reported RSRP), that is used for evaluation of reporting criteria or for measurement reporting; $F_{n-1}$ is the old filtered measurement result, where $F_0$ is set to $M_1$ when the first measurement result from the physical layer is received; and $$a = 1/2^{(k/4)},$$

where k 15 is the filter coefficient for the corresponding measurement quantity.

The filtering formula, $F_n=(1-\alpha)F_{n-1}+\alpha M_n$, assumes that successive physical layer measurements are available within a specified time period (e.g., physical layer measurements occur at least once every 200 ms when a UE is not in DRX). In certain embodiments for LAA, if the physical layer measurement is not available (e.g., due to a discovery signal not having been transmitted), the physical layer does not provide the $M_n$ quantity mentioned above. When the UE does receive a discovery signal at a later time, an $M_n$ value is provided to the layer 3 filter.

As may be appreciated, for purpose of illustration, RSRP values may be generated as follows: durations between successive measurements may be generated randomly based on a Gaussian distribution with a mean of 200 ms and a standard deviation of 400 ms; a mean value of RSRP −90 dbm is selected and RSRP measurements are generated as Gaussian random samples with the chosen mean and a standard deviation of 4 db; if the duration between the n-th measurement occasion and the n+1-th measurement occasion is more than a threshold value of 1000 ms, the mean value of RSRP is changed as follows: with probability ⅓ the mean value of RSRP stays the same; with probability ⅓ it increases by 8 db and with probability ⅓ it decreases by 8 db.

As may be appreciated, the purpose of filtering may be to avoid reacting to spikes in measurements (e.g., such as sending a measurement report based on measurements being temporarily much higher or lower). Accordingly, the efficacy of a filter may be measured in terms of how quickly it converges to mean values. The graph 400 shows the effect of applying the layer 3 filter of formula $F_n=(1-\alpha)F_{n-1}+\alpha M_n$ with a filter-coefficient of 8 to RSRP measurements.

As illustrated, the layer 3 filter of formula $F_n=(1-\alpha)F_{n-1}+\alpha M_n$ may not react quickly to measurements that have changed after a fairly long duration of absence of discovery signals. Thus, although measurements may be too low, the UE may not trigger a measurement report thereby resulting in radio link failures, handover failures, and so forth.

Figure 5:
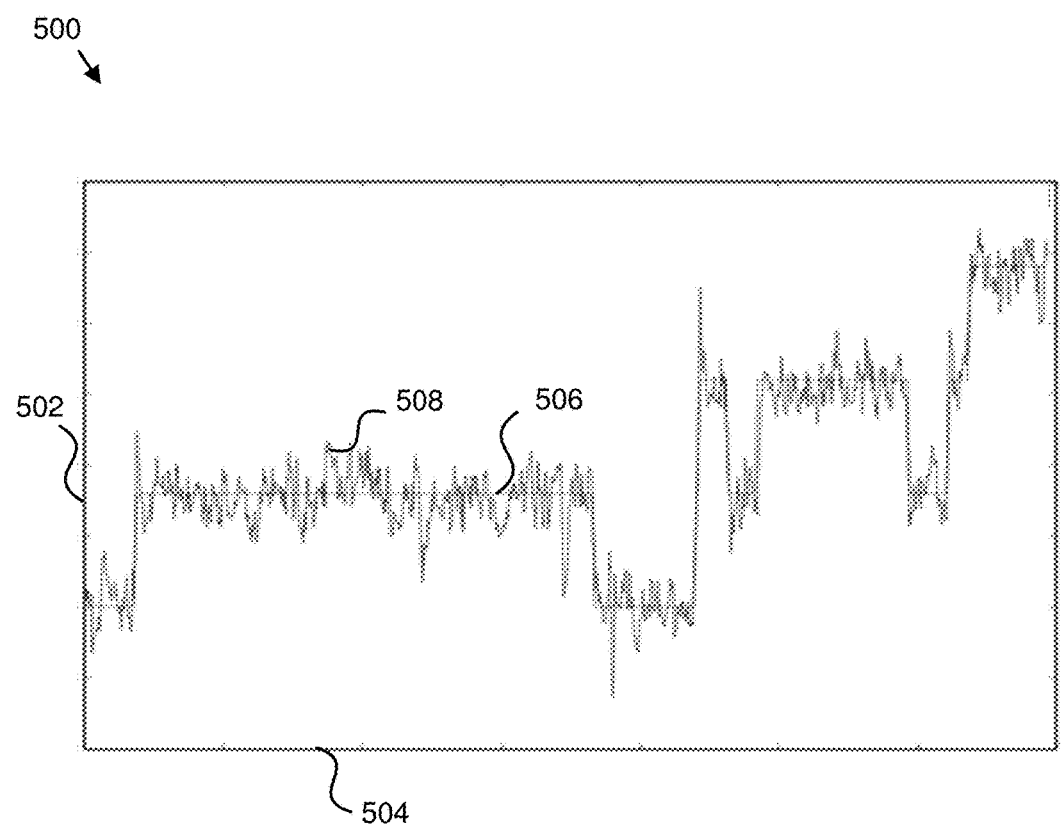
FIG. 5 illustrates a graph of another embodiment of layer 3 filtering.

FIG. 5 illustrates a graph 500 of another embodiment of layer 3 filtering. In the illustrated embodiment, RSRP 502 in the y-axis is illustrated over time 504 in the x-axis. Specifically, a mean RSRP 506 and a filtered RSRP 508 are illustrated over time 504. The filtered RSRP 508 is calculated using the following formula: $F_n=(1-\tilde{\alpha})F_{n-1}+\alpha M_n$, where $M_n$ is the latest received measurement result (e.g., measured RSRP) from the physical layer; $F_n$ is the updated filtered measurement result (e.g., reported RSRP), that is used for evaluation of reporting criteria or for measurement reporting; $F_{n-1}$ is the old filtered measurement result, where $F_0$ is set to $M_1$ when the first measurement result from the physical layer is received; $\tilde{\alpha}=\alpha$ if the time duration between $M_n$ and $M_{n-1}$ is less than a threshold duration (e.g. 1000 ms), and $\tilde{\alpha}=1$ otherwise (e.g., if the time duration between $M_n$ and $M_{n-1}$ is greater than or equal to a threshold duration);

$$a = 1/2^{(k/4)};$$

and k is the filter coefficient for the corresponding measurement quantity. As may be appreciated, the threshold duration may be signaled to a UE from an eNB. In some embodiments, $\tilde{\alpha}=\alpha$ if the time duration between $M_n$ and $M_{n-1}$ is less than or equal to a threshold duration (e.g. 1000 ms), and $\tilde{\alpha}=1$ otherwise (e.g., if the time duration between $M_n$ and $M_{n-1}$ is greater than a threshold duration).

Such a formula $F_n=(1-\tilde{\alpha})F_{n-1}+\tilde{\alpha}M_n$ may produce a simple forgetting filter. In some embodiments, a simple forgetting filter may be produced by using the formula $F_n=(1-\alpha)F_{n-1}+\alpha M_n$ where $$a = 1/2^{(\tilde{k}/4)},$$

and a modified filter coefficient $\tilde{k}=k$ if the time duration between $M_n$ and $M_{n-1}$ is less than the threshold duration, and $\tilde{k}=0$ otherwise (e.g., if the time duration between $M_n$ and $M_{n-1}$ is greater than or equal to a threshold duration), where k is the filter coefficient for the corresponding measurement quantity. In some embodiments, $\tilde{k}=k$ if the time duration between $M_n$ and $M_{n-1}$ is less than or equal to the threshold duration, and $\tilde{k}=0$ otherwise (e.g., if the time duration between $M_n$ and $M_{n-1}$ is greater than a threshold duration), where k is the filter coefficient for the corresponding measurement quantity.

FIG. 5 illustrates the effect of using the simple forgetting filter on the same RSRP measurements used to produce FIG. 4. It should be noted that a threshold duration of 1000 ms is used. As illustrated by the filtered RSRP 508, the simple forgetting filter reacts quickly to measurements that have changed after a fairly long duration of absence of discovery signals. However, the filtered RSRP 508 may generate significant measurement spikes thereby resulting in excessive measurement reporting and handovers.

Figure 6:
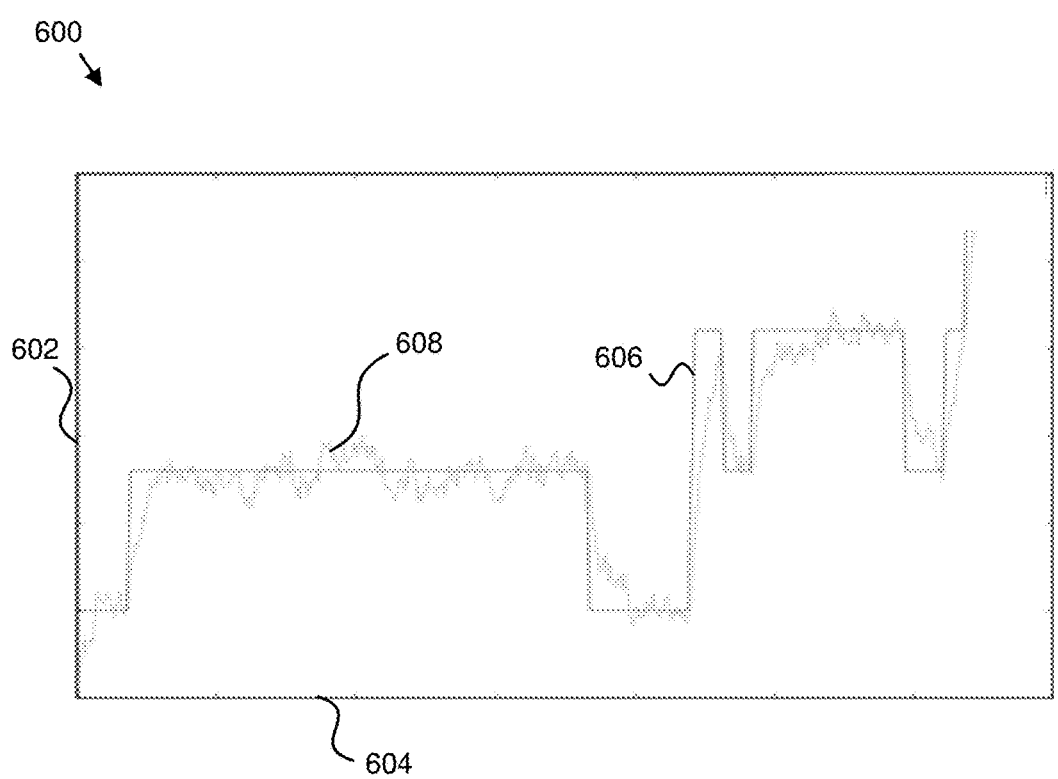
FIG. 6 illustrates a graph of a further embodiment of layer 3 filtering.

FIG. 6 illustrates a graph 600 of a further embodiment of layer 3 filtering. In the illustrated embodiment, RSRP 602 in the y-axis is illustrated over time 604 in the x-axis. Specifically, a mean RSRP 606 and a filtered RSRP 608 are illustrated over time 604. The filtered RSRP 608 is calculated using the following formula: $F_n=(1-\tilde{\alpha})F_{n-1}+\tilde{\alpha}M_n$, where $M_n$ is the latest received measurement result (e.g., measured RSRP) from the physical layer; $F_n$ is the updated filtered measurement result (e.g., reported RSRP), that is used for evaluation of reporting criteria or for measurement reporting; $F_{n-1}$ is the old filtered measurement result, where $F_0$ is set to $M_1$ when the first measurement result from the physical layer is received;

$$\tilde{a} = a \frac{1}{1+e^{(1-\frac{t}{T})}};$$

t is the time duration between $M_n$ and $M_{n-1}$; T is a threshold duration (e.g. 1000 ms), which may be signaled to the UE;

$$a = 1/2^{(k/4)};$$

and k is the filter coefficient for the corresponding measurement quantity.

Such a formula $F_n=(1-\tilde{\alpha})F_{n-1}+\tilde{\alpha}M_n$ may produce a sigmoid forgetting filter. In some embodiments, a sigmoid forgetting filter may be produced by using the formula $F_n=(1-\alpha)F_{n-1}+\alpha M_n$ where $$a = 1/2^{(\tilde{k}/4)},$$

and a modified filter coefficient $\tilde{k}=k+4\ \log_2(1+e^{(1-t/T)})$, where k is the filter coefficient for the corresponding measurement quantity.

FIG. 6 illustrates the effect of using the sigmoid forgetting filter on the same RSRP measurements used to produce FIG. 4. It should be noted that a threshold duration of 1000 ms is used. As illustrated by the filtered RSRP 608, the sigmoid forgetting filter may not generate significant measurement spikes thereby inhibiting excessive measurement reporting and handovers.

In certain embodiments, a linear forgetting filter may be used. A linear forgetting filter may use the following formula: $F_n=(1-\tilde{\alpha})F_{n-1}+\tilde{\alpha}M_n$, where $M_n$ is the latest received measurement result (e.g., measured RSRP) from the physical layer; $F_n$ is the updated filtered measurement result (e.g., reported RSRP), that is used for evaluation of reporting criteria or for measurement reporting; $F_{n-1}$ is the old filtered measurement result, where $F_0$ is set to $M_1$ when the first measurement result from the physical layer is received;

$$\tilde{a} = \min\left(1, a\frac{\max(t, T)}{T}\right);$$

t is the time duration between $M_n$ and $M_{n-1}$; T is a threshold duration (e.g. 1000 ms), which may be signaled to the UE;

$$a = 1/2^{(k/4)};$$

and k is the filter coefficient for the corresponding measurement quantity.

Other similar embodiments may generalize the sigmoid and linear forgetting filter embodiments. Such embodiments may include choosing other functions for a. For example, a could be chosen such that $\tilde{\alpha}=\alpha H(t)$ where H(t) is a mathematical function of such t that H(t) increases with increasing values of t. Additionally, H(t) can be chosen such that H(t) has values between 0 and 1 for all values of t.

Figure 7:
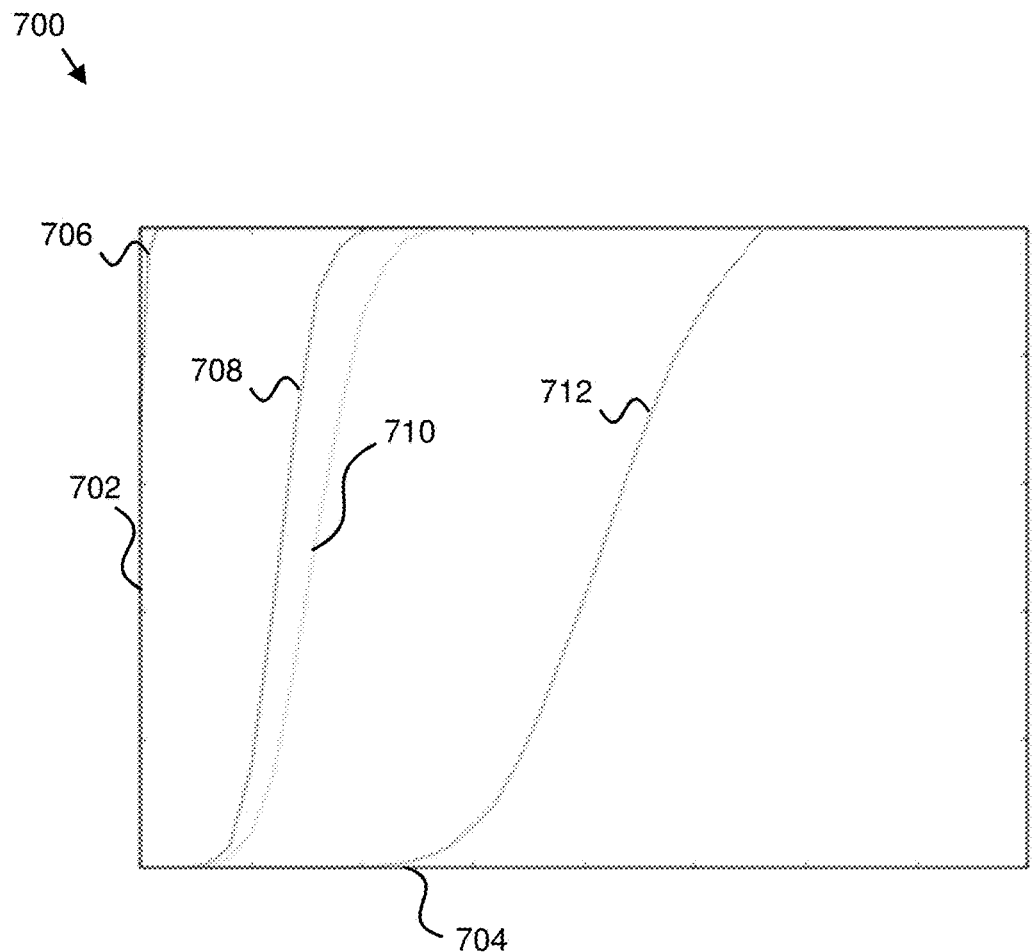
FIG. 7 illustrates a graph of various embodiments of measurement adaptations.

FIG. 7 illustrates a graph 700 of various embodiments of measurement adaptations. In the illustrated embodiment, probability ("P")[x parameter <x value] 702 in the y-axis is illustrated over P[measurement when channel busy] 704 in the x-axis. Specifically, a P that a channel is busy when using periodic measurements 706, uniformly distributed random measurements 708, adaptive measurements 710, and an actual P that a channel is busy 712 are illustrated.

As may be appreciated, RSSI may be used to estimate a load on carriers. Moreover, a UE may report RSSI measurements for one or more LAA carriers. Thus, a network (e.g., eNB) may be enabled to choose whether and which carriers to configure as LAA carriers for the UE. RSSI measurements may also be used to determine when to remove a carrier (due to excessive load from other nodes). Consequently, the measured RSSI may be used to capture a time-varying load on the carrier.

In various configurations, the UE may perform measurements on discovery signals within periodically occurring DMTC time windows. A DMTC time window may be a time duration during which all discovery signals (e.g., from the serving and neighbor LAA eNBs) are expected to be transmitted. That is, for example, the UE may perform measurements (e.g., RSSI and so forth) every 40 ms, which are then averaged and/or filtered. The periodic measurement may not enable the UE to obtain measurements that are representative of the time-varying load on the carrier, such as because measuring RSSI during the DMTC time windows may result in an RSSI that indicates a load that is higher than the actual load on the carrier.

Moreover, in certain embodiments, RSSI measurements may not be performed during DMTC time windows. As may be appreciated, a UE may have gaps for performing measurements on "inter-frequency" LAA carriers—i.e., carriers without configured secondary cells. If the UE uses gaps to perform LAA-RSSI measurements, the network may configure specific subframes during which the LAA-RSSI measurements occur. In various embodiments, LAA-RSSI measurements may be configured in addition to RSRP measurements for a carrier. Therefore, in order to reduce the number of times the UE switches between monitoring the DL and performing a measurement, LAA-RSSI measurements may occur immediately adjacent to the DMTC windows. As may be appreciated, this may provide a benefit of not having to explicitly configure the LAA-RSSI measurement gaps.

In some embodiments, LAA-RSSI measurement gaps may be used and may occur immediately before or immediately after RSRP measurement gaps. When a UE does not need a measurement gap to perform a measurement on an LAA carrier, the measurement can occur when the carrier is busy (due to transmissions from either the serving LAA eNB or from another node) or when the channel is idle. Measurements may be considered to be representative of load on the channel, if the proportion of measurements that occur when the channel is busy is roughly the same as the proportion of time that the channel is busy. As may be appreciated, RSSI measurements may be considered to be representative of load on a channel if: P[Measurement occurs when Channel is Busy]−P[Channel is busy]<∈, for some small ∈.

To get more representative RSSI measurements than may be obtained with periodic measurements, the UE may perform continuous measurements of the channel or perform measurements at random occasions. As may be appreciated, performing continuous measurements of a channel may consume a large amount of power; therefore, performing measurements at random occasions may be preferred because less power is consumed.

In one example of obtaining representative RSSI measurements, consider packet arrival having a Poisson distribution with an inter-arrival time of 40 ms. Each packet may be assumed to be 10 ms long. For transmission over the channel, it may be assumed that the packet is transmitted in 1 ms blocks which are separated in time by 8 ms. Periodic and random measurements may be compared in such an example. For periodic measurements, the measurement periodicity may be 40 ms and the duration of the measurement may be 1 ms. For the random measurements, the measurement duration may be 1 ms, and the duration between the start of the measurements may be a uniformly distributed random variable between 10 and 70 ms. The measurement parameters may be chosen such that the UE spends the substantially the same percentage of time on measurements in both approaches. FIG. 7 shows a CDF of the probability that measurement occurs when the channel is busy for periodic measurements 706 and uniformly distributed random measurements 708, and the probability that the channel is busy 712.

As can be seen, uniformly distributed random measurements 708 provide some advantages over periodic measurements 706. Specifically, the value of P[Measurement occurs when Channel is Busy]−P[Channel is busy] is smaller for the uniformly distributed random measurements 708 compared to that for the periodic measurements 706.

The probability that a channel is busy when using adaptive measurements 710 is also illustrated. One embodiment of an approach for using adaptive measurements 710 is explained forthwith. Specifically, occasions (e.g., time windows) where the UE performs measurements are chosen randomly, as follows: 1) Two measurement periodicities are configured at the UE. The first is a "quiet channel periodicity" (e.g., quite channel inter-measurement duration) and the second is a "busy channel periodicity" (e.g., busy channel inter-measurement duration). The quiet channel periodicity is longer than the busy channel periodicity. The UE is also configured with separate measurement durations for busy and quiet periods. Additionally, the UE is configured with a busyOverhang integer parameter; 2) During a measurement occasion, if the channel is determined to be busy, the UE uses the busy channel periodicity to determine an occasion in the future to perform the next measurement. For example, the next occasion may be determined based on an exponential distribution with a mean equal to the busy channel periodicity. Alternatively, the next occasion may be based on the current time plus the busy channel periodicity; and 3) If the channel is determined to be not busy, the UE starts a counter that is set to the value of the busyOverhang integer. The UE then selects the next measurement occasion based on the busy channel periodicity, as described above. At each measurement occasion, that follows: a) If the channel is not busy, the UE decrements the counter by 1. If the counter reaches 0, the UE uses the quiet channel periodicity for future measurements occasions (until the channel is determined to be busy); and b) If the channel is busy, the UE uses the busy channel periodicity. In one embodiment, a quiet channel periodicity may be 200 ms and a busy channel periodicity may be 8 ms, while in other embodiments the quiet channel periodicity and the busy channel periodicity may be any suitable value. Furthermore, in one embodiment, a measurement duration during quiet periods may be 6 ms and a measurement duration during busy periods may be 1 ms, while in other embodiments, the measurement durations may be any suitable values.

FIG. 7 shows how the probability that measurement occurs when the channel is busy using adaptive measurements 710 may be closer to the probability that the channel is busy 712 than the probability that measurement occurs when the channel is busy for periodic measurements 706 and uniformly distributed random measurements 708.

It should be noted that in certain LTE systems a UE computes an RSSI metric as part of RSRQ computation. RSSI may be defined as including the linear average of the total received power (in [W]) observed only in certain OFDM symbols of measurement subframes, in the measurement bandwidth over N number of resource blocks by the UE from all sources, including co-channel serving and non-serving cells, adjacent channel interference, thermal noise, etc. In this disclosure, a new measurement quantity is defined that is not restricted to OFDM symbols of measurement subframes because, for example, there may not even be a reference symbol or signal transmission present when a UE performs such a measurement. The new measurement quantity may be referred to as LAA-RSSI, energy measurement, and/or a carrier loading measurement.

A duration of an LAA-RSSI measurement (e.g., Xwin) may be less than or equal to five subframes. In certain embodiments, the duration of an LAA-RSSI measurement may be one or two subframes to reduce UE power consumption. The duration of the LAA-RSSI measurement may be set via RRC configuration.

A location of an LAA-RSSI measurement may be in any suitable location. For example, an LAA-RSSI measurement may be in any of the following locations: within DMTC occasions (e.g., time windows) of a UE; and in separate LAA-RSSI occasions, as explained in greater detail below.

LAA-RSSI measurements may be performed within DMTC occasions of a UE. As may be appreciated, DMTC occasions are 6 ms long and may occur with a configurable periodicity (e.g., 10 ms, 20 ms, 40 ms, 80 ms, 160 ms, and so forth). In certain embodiments, UEs may measure RSRP and/or RSRQ after detecting discovery signals within a configured DMTC occasion. For LAA embodiments, the UE may measure LAA-RSSI within each DMTC occasion, or within a subset of the DMTC occasions. For example, DMTC periodicity may be configured to be 40 ms while LAA-RSSI measurement periodicity may be configured as 640 ms. In this example, a UE measures LAA-RSSI every 16th DMTC occasion. The exact subframes that the UE uses for LAA-RSSI measurement may be determined via higher layer configuration (e.g., a subframe offset related to LAA-RSSI measurement from the start of a DMTC occasion where LAA-RSSI is measured), via a UE autonomously picking the subframes from within the DMTC occasion, via a specification, and so forth. As may be appreciated, higher layer configuration may be configuration information received from messaging at the RRC layer, the MAC layer, or any other suitable layer. Moreover, higher layer signaling may be messaging at the RRC layer, the MAC layer, or any other suitable layer.

Taking LAA-RSSI measurements within DMTC occasions of a UE may be advantageous because a UE has to wake up during DMTC occasions for other measurements such as RSRP and RSRQ and performing LAA-RSSI measurements at the same time may result in relatively smaller additional power consumption for the UE.

LAA-RSSI measurements may be performed in separate LAA-RSSI occasions. In such LAA-RSSI occasions, each LAA-RSSI occasion may be a window of K (e.g., K>=Xwin, K>=5 subframes) subframes. Within each LAA-RSSI occasion, the exact subframes that the UE uses for LAA-RSSI measurement (e.g., for the case where K>=Xwin) may be determined from higher layer configuration (e.g., a subframe offset related to LAA-RSSI measurement from the start of an LAA-RSSI occasion), from the UE autonomously picking the subframes, via specification, and so forth. Moreover, the start of each LAA-RSSI occasion may be determined from one of the following: LAA-RSSI occasions may start immediately before or after each DMTC occasion or a subset of DMTC occasions configured for the UE; LAA-RSSI occasions may start immediately following L1 offset subframes after each DMTC occasion or a subset of DMTC occasions for the UE; and the UE may be configured via higher layers with an LAA-RSSI-periodicity and an LAA-RSSI offset, which are explained in greater detail below.

LAA-RSSI occasions may start immediately before or after each DMTC occasion or a subset of DMTC occasions configured for the UE. More specifically, a UE may be configured via higher layers with the following parameters a DMTC-periodicity, a DMTC-offset, and optionally an LAA-RSSI-periodicity. The first subframe of each LAA-RSSI occasion occurs at a SFN and subframe of the PCell meeting the following conditions: SFN mod T=FLOOR (DMTC-offset/10); subframe=DMTC-offset mod 10+L0 offset; with T=LAA-RSSI-periodicity/10 (if configured with LAA-RSSI-periodicity), or T=DMTC-periodicity/10 (if not configured with LAA-RSSI-periodicity); and L0 offset=6. With some example parameter settings, the above equations may lead to the following behavior. If a UE is configured with a DMTC-periodicity of 40 ms and DMTC-offset is 0, DMTC occasions for the UE are subframes [0 to 5], [40 to 45], [80-85], and so forth. If the LAA-RSSI periodicity is also 40 ms, the LAA-RSSI occasions for the UE then start in subframes 6, 46, 86, and so forth. If the LAA-RSSI periodicity is 80 ms, the LAA-RSSI occasions for the UE then start in subframes 6, 86, and so forth.

LAA-RSSI occasions may start immediately following L1 offset subframes after each DMTC occasion or a subset of DMTC occasions for the UE. L1 offset may be a pseudo-random offset generated by a UE with the following characteristics. L1 offset<P1. In one example, P1=DMTC-periodicity minus the duration of a DMTC occasion. In another example, P1=DMTC-periodicity minus the duration of a DMTC occasion minus the duration of an LAA-RSSI occasion. The starting seed for the pseudo-random number generator generating the L1 offset may be a function of one or more of the following: the PCID of the serving cell to which the UE reports its LAA-RSSI measurement, C-RNTI of the UE, SFN of the corresponding DMTC occasion, and a parameter configured by higher layers (e.g., a DMRS scrambling sequence initialization value, a virtual cell ID, and so forth).

More specifically, a UE may be configured via higher layers with the following parameters: a DMTC-periodicity, a DMTC-offset, and optionally an LAA-RSSI-periodicity. The first subframe of each LAA-RSSI occasion occurs at a SFN and subframe of the PCell meeting the following conditions: SFN mod T=FLOOR (DMTC-offset/10); subframe=DMTC-offset mod 10+(L1 offset(SFN))mod(P1); and with T=LAA-RSSI-periodicity/10 (if configured with LAA-RSSI-periodicity), or T=DMTC-periodicity/10 (if not configured with LAA-RSSI-periodicity). For example, L1 offset (SFN)=(A*L1 offset (SFN−1))mod(D); where A and D are any two large relatively prime numbers (e.g., A=39827; D=65537; L1 offset(−1)=nRNTI which is the Ue's C-RNTI. In this example, a separate L1 offset is determined for each SFN and the seed for generating pseudo-random values of L1 offset is the UE's C-RNTI. As previously discussed, the seed may instead be based on PCID, or other higher layer configured parameters.

The UE may be configured via higher layers with an LAA-RSSI-periodicity and an LAA-RSSI offset. LAA-RSSI occasions may be determined from these parameters (e.g., they are independently configured from DMTC occasions). The first subframe of each LAA-RSSI occasion occurs at an SFN and subframe of the PCell meeting the following conditions: SFN mod T=FLOOR (LAA-RSSI-offset/10); subframe=LAA-RSSI-offset mod 10; and T=LAA-RSSI-periodicity/10.

In certain embodiments, a UE may report the percent of time that the discovery signal was delayed as an indication of load. Moreover, in certain embodiments, there may be independent filtering of two RSSI bins: one bin is above a threshold (e.g., an occupancy RSSI), and the other is below the threshold. The filtering may use shorter term averaging (e.g., first filter) for the first bin and longer term averaging (e.g., second filter) for the second bin.

Figure 8:
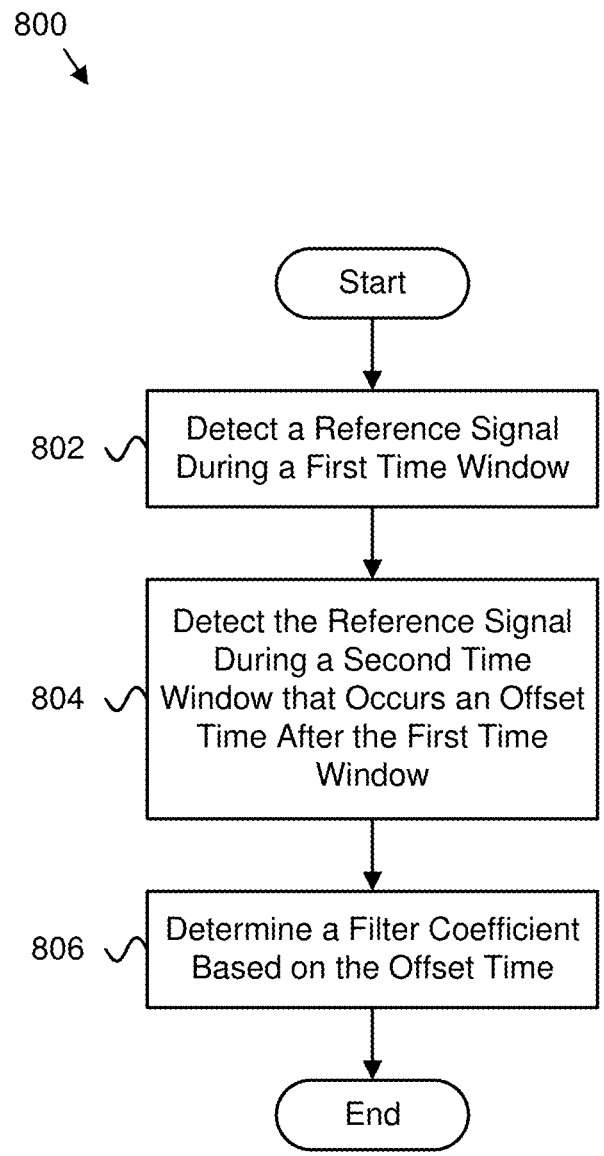
FIG. 8 is a schematic flow chart diagram illustrating one embodiment of a method for enhanced filtering.

FIG. 8 is a schematic flow chart diagram illustrating one embodiment of a method 800 for enhanced filtering. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include detecting 802 a reference signal during a first time window of a set of time windows during which reception of the reference signal is expected. In some embodiments, the remote unit 102 (e.g., the transmitter 210) may detect 802 the reference signal during the first time window of the set of time windows during which reception of the reference signal is expected.

The method 800 may include detecting 804 the reference signal during a second time window of the set of time windows. The second time window occurs an offset time after the first time window. In certain embodiments, the remote unit 102 may detect 804 the reference signal during the second time window of the set of time windows. The offset time may include one or more time windows of the set of time windows during which the reference signal is not detected.

The method 800 may also include determining 806 a filter coefficient based on the offset time, then the method 800 may end. The filter coefficient is used to generate a filtered measurement. In certain embodiments, the remote unit 102 may determine 806 the filter coefficient based on the offset time. In some embodiments, determining 806 the filter coefficient based on the offset time includes determining the filter coefficient by summing a predetermined filter coefficient and a parameter derived as a function of the offset time. In various embodiments, determining 806 the filter coefficient based on the offset time includes determining the filter coefficient to be a first value if the offset time is less than a threshold time and to be a second value if the offset time is greater than or equal to the threshold time.

Figure 9:
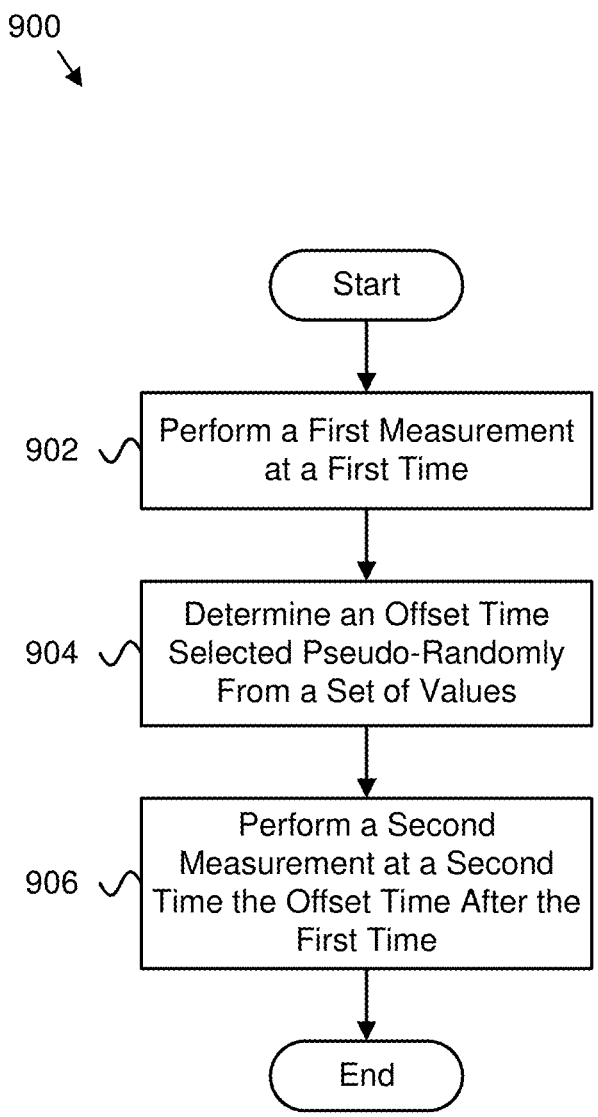
FIG. 9 is a schematic flow chart diagram illustrating one embodiment of a method for enhanced measurements.

FIG. 9 is a schematic flow chart diagram illustrating one embodiment of a method 900 for enhanced measurements. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include performing 902 a first measurement at a first time. In certain embodiments, a remote unit 102 may perform 902 the first measurement at the first time. The method 900 may also include determining 904 an offset time selected pseudo-randomly from a set of values. In one embodiment, the remote unit 102 may determine 904 the offset time selected pseudo-randomly from the set of values. In one embodiment, determining 904 the offset time selected pseudo-randomly from the set of values includes determining the offset time based on at least one of a subframe index, a system frame number, a C-RNTI, a physical cell id, a virtual cell id, and a scrambling sequence initialization value. In another embodiment, determining 904 the offset time selected pseudo-randomly from the set of values includes determining the offset time based on a modulo function with at least one of the following inputs: a subframe index, a system frame number, a cell radio network temporary identifier ("C-RNTI"), a physical cell id, a virtual cell id, and a scrambling sequence initialization value.

The method 900 may include performing 906 a second measurement at a second time, the second time being the offset time after the first time. The second measurement is used for a carrier loading measurement. Then the method 900 may end. In certain embodiments, the remote unit 102 may perform 906 the second measurement at the second time.

Figure 10:
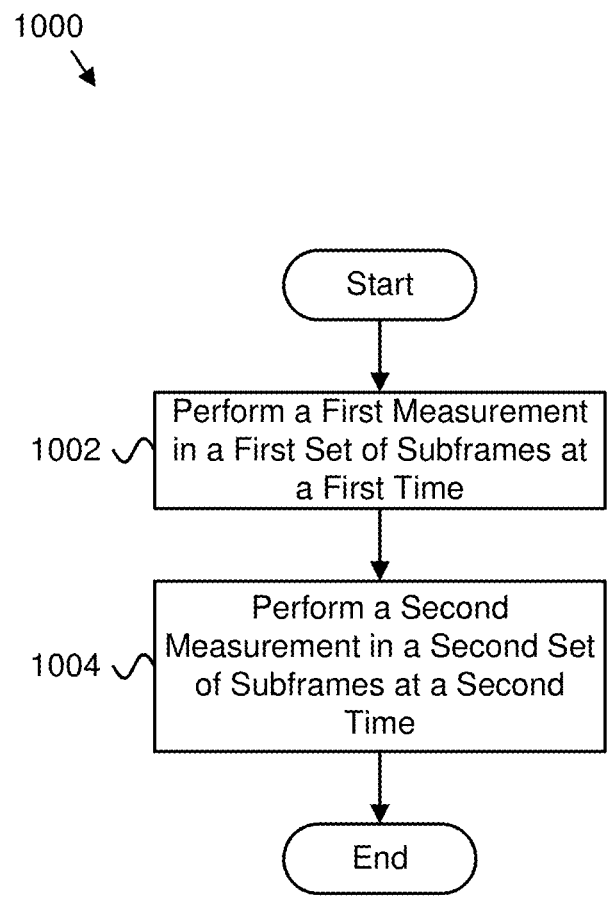
FIG. 10 is a schematic flow chart diagram illustrating another embodiment of a method for enhanced measurements.

FIG. 10 is a schematic flow chart diagram illustrating another embodiment of a method 1000 for enhanced measurements. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

The method 1000 may include performing 1002 a first measurement in a first set of subframes at a first time. The first set of subframes includes at least one subframe. In certain embodiments, a remote unit 102 may perform 1002 the first measurement in the first set of subframes at the first time. The method 1000 may also include performing 1004 a second measurement in a second set of subframes at a second time, then the method 1000 may end. The second set of subframes includes at least one subframe. In one embodiment, the remote unit 102 may perform 1004 the second measurement in the second set of subframes at the second time.

The second set of subframes is offset in time from the first set of subframes by an offset time. The offset time is determined using a pseudo-random function. In one embodiment, the pseudo-random function determines the offset time based on at least one of a subframe index, a system frame number, a cell radio network temporary identifier ("C-RNTI"), a physical cell id, a virtual cell id, and a scrambling sequence initialization value. In some embodiments, the first measurement is an RSRP measurement and the second measurement is a carrier loading measurement. In various embodiments, the first measurement occurs in a DMTC time window and the second measurement occurs outside of a DMTC time window.

Figure 11:
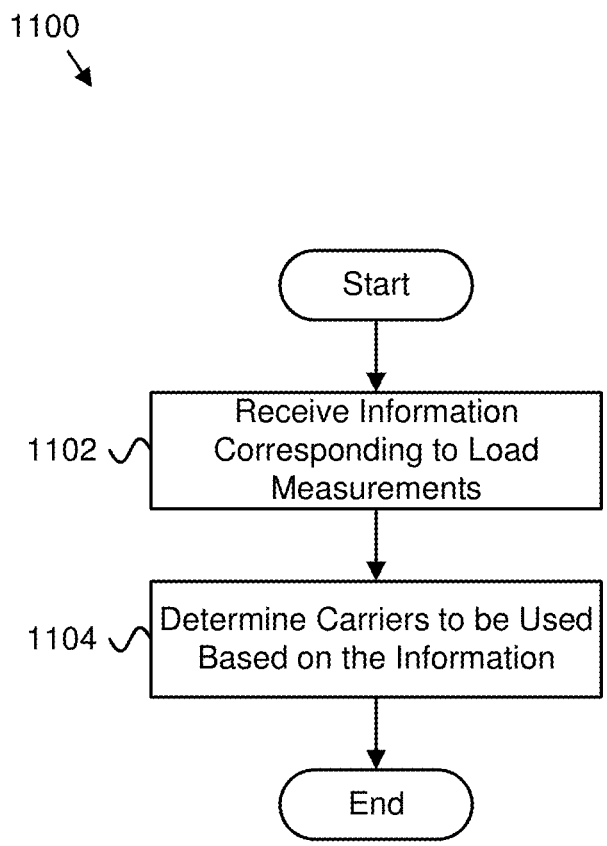
FIG. 11 is a schematic flow chart diagram illustrating one embodiment of a method for carrier determination.

FIG. 11 is a schematic flow chart diagram illustrating one embodiment of a method 1100 for carrier determination. In some embodiments, the method 1100 is performed by an apparatus, such as the base unit 104. In certain embodiments, the method 1100 may be performed by a processor executing program code, for example, a microcontroller, a microprocessor, a CPU, a GPU, an auxiliary processing unit, a FPGA, or the like.

The method 1100 may include receiving 1102 information corresponding to load measurements made by a device (e.g., the remote unit 102). The load measurements may include a first measurement in a first set of subframes at a first time. The first set of subframes includes at least one subframe. The load measurements may also include a second measurement in a second set of subframes at a second time. The second set of subframes includes at least one subframe. The second set of subframes is offset in time from the first set of subframes by an offset time. The offset time is determined using a pseudo-random function. In certain embodiments, a base unit 104 may receive 1102 the information corresponding to the load measurements. The method 1100 may also include determining 1104 carriers to be used based on the information, then the method 1100 may end. In one embodiment, the base unit 104 may determine 1104 the carriers to be used based on the information.

In some embodiments, the first measurement is an RSRP measurement and the second measurement is a carrier loading measurement. In various embodiments, the first measurement occurs in a DMTC time window and the second measurement occurs outside of a DMTC time window.

Figure 12:
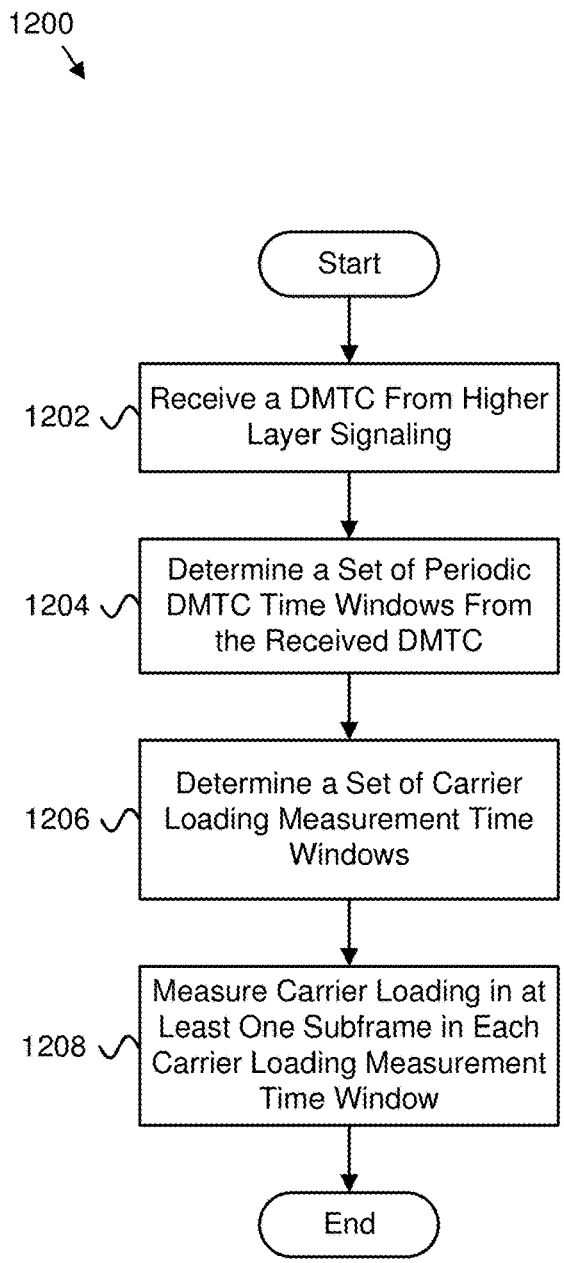
FIG. 12 is a schematic flow chart diagram illustrating a further embodiment of a method for enhanced measurements.

FIG. 12 is a schematic flow chart diagram illustrating a further embodiment of a method 1200 for enhanced measurements. In some embodiments, the method 1200 is performed by an apparatus, such as the remote unit 102. In certain embodiments, the method 1200 may be performed by a processor executing program code, for example, a microcontroller, a microprocessor, a CPU, a GPU, an auxiliary processing unit, a FPGA, or the like.

The method 1200 may include receiving 1202 a DMTC from higher layer signaling. In certain embodiments, a remote unit 102 may receive 1202 the DMTC from higher layer signaling. The method 1200 may also include determining 1204 a set of periodic DMTC time windows from the received DMTC. Each periodic DMTC time window of the set of periodic DMTC time windows includes a set of contiguous subframes. In one embodiment, the remote unit 102 may determine 1204 the set of periodic DMTC time windows from the received DMTC.

The method 1200 may include determining 1206 a set of carrier loading measurement time windows. Each carrier loading measurement time window of the set of carrier loading measurement time windows includes a set of contiguous subframes. In one embodiment, the remote unit 102 may determine 1206 the set of carrier loading measurement time windows.

The method 1200 may include measuring 1208 carrier loading in at least one subframe in each carrier loading measurement time window of the set of carrier loading measurement time windows. Then the method 1200 may end. In certain embodiments, the remote unit 102 may measure 1208 carrier loading in at least one subframe in each carrier loading measurement time window of the set of carrier loading measurement time windows.

Each carrier loading measurement time window of the set of the carrier loading measurement time windows occurs immediately adjacent in time to a respective periodic DMTC time window of the set of periodic DMTC time windows and each carrier loading measurement time window does not overlap its respective periodic DMTC time window.

In one embodiment, the method includes measuring at least one of reference signal received power ("RSRP") and reference signal received quality ("RSRQ") in at least one subframe of each periodic DMTC time window of the set of periodic DMTC time windows. In certain embodiments, each carrier loading measurement time window of the set of carrier loading measurement time windows is a periodic carrier loading measurement time window. In certain embodiments, a carrier loading measurement time window periodicity is a multiple of a DMTC time window periodicity.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   performing, by use of a processor, a first measurement at a first time, wherein the first measurement is a power measurement;
   determining whether the first measurement is below a threshold;
   determining an offset time selected pseudo-randomly from a set of values and a measurement duration for a second measurement, wherein determining the offset time comprises:
      determining that the offset time is a first offset time and that the measurement duration is a first measurement duration in response to the first measurement being below the threshold; and
      determining that the offset time is a second offset time and that the measurement duration is a second measurement duration in response to the first measurement not being below the threshold, wherein the second offset time is shorter than the first offset time, and the first measurement duration is different from the second measurement duration; and
   performing the second measurement at a second time using the measurement duration, the second time being the offset time after the first time, wherein the second measurement is used for a carrier loading measurement.

2. The method of claim 1, wherein determining the offset time selected pseudo-randomly from the set of values comprises determining the offset time based on at least one of a subframe index, a system frame number, a cell radio network temporary identifier ("C-RNTI"), a physical cell id, a virtual cell id, and a scrambling sequence initialization value.

3. The method of claim 1, wherein determining the offset time selected pseudo-randomly from the set of values comprises determining the offset time based on a modulo function with at least one of the following inputs: a subframe index, a system frame number, a cell radio network temporary identifier ("C-RNTI"), a physical cell id, a virtual cell id, and a scrambling sequence initialization value.

4. The method of claim 1, wherein determining the offset time selected pseudo-randomly from the set of values comprises selecting a value from the set of values based on a random number generator function of the processor.

5. The method of claim 1, wherein determining the offset time comprises:
   determining the offset time based on a first pseudo random function if the first measurement is below the threshold; and
   determining the offset time based on a second pseudo random function if the first measurement is not below the threshold.

6. The method of claim 1, wherein determining the offset time comprises:
   determining the offset time based on a first pseudo random function if the first measurement is below the threshold; and
   setting the offset time to a fixed predetermined value if the first measurement is not below the threshold.

7. The method of claim 1, wherein performing the first measurement at the first time comprises performing the first measurement in a first set of subframes and performing the second measurement at the second time comprises performing the second measurement in a second set of subframes.

8. The method of claim 1, further comprising determining a carrier to be used by reporting the carrier loading measurement to a device, and receiving an indication from the device of which carrier to use.

9. An apparatus comprising:
   a receiver that receives information;
   a processor that:
      performs a first measurement in a first set of subframes received by the receiver at a first time, wherein the first set of subframes comprises at least one subframe, and the first measurement is a power measurement;
      determines whether the first measurement is below a threshold;
      determines an offset time using a pseudo-random function and a measurement duration for a second measurement, wherein the processor determines the offset time by:
         determining that the offset time is a first offset time and that the measurement duration is a first measurement duration in response to the first measurement being below the threshold; and
         determining that the offset time is a second offset time and that the measurement duration is a second measurement duration in response to the first measurement not being below the threshold, wherein the second offset time is shorter than the first offset time, and the first measurement duration is different from the second measurement duration; and
      performs the second measurement in a second set of subframes received by the receiver at a second time using the measurement duration, wherein the second set of subframes comprises at least one subframe, and the second measurement is a load measurement;
      wherein the second set of subframes is offset in time from the first set of subframes by an offset time.

10. The apparatus of claim 9, wherein the pseudo-random function determines the offset time based on at least one of a subframe index, a system frame number, a cell radio network temporary identifier ("C-RNTI"), a physical cell id, a virtual cell id, and a scrambling sequence initialization value.

11. The apparatus of claim 9, wherein the first measurement is a reference signal received power ("RSRP") measurement and the second measurement is a carrier loading measurement.

12. The apparatus of claim 9, wherein the first measurement occurs in a discovery signal measurement timing configuration ("DMTC") time window and the second measurement occurs outside of a DMTC time window.

13. The apparatus of claim 9, wherein the processor determines a carrier to be used.

14. The apparatus of claim 13, wherein the processor determines the carrier to be used by reporting the carrier loading measurement to a device, and receiving an indication from the device of which carrier to use.

15. The apparatus of claim 13, wherein the processor determines the carrier to be used by selecting a carrier based on the carrier loading measurement.

16. An apparatus comprising:
   a receiver that receives information corresponding to load measurements made by a device, wherein the load measurements comprise:

a first measurement in a first set of subframes at a first time, wherein the first set of subframes comprises at least one subframe, and the first measurement is a power measurement; and a second measurement in a second set of subframes at a second time using a measurement duration for the second measurement, wherein the second set of subframes comprises at least one subframe, and the second measurement is a load measurement;

wherein the second set of subframes is offset in time from the first set of subframes by an offset time, the offset time being determined using a pseudo-random function, the offset time is a first offset time and the measurement duration is a first measurement duration in response to the first measurement being below a threshold, the offset time is a second offset time and the measurement duration is a second measurement duration in response to the first measurement not being below the threshold, the second offset time is shorter than the first offset time, and the first measurement duration is different from the second measurement duration; and a processor that determines carriers to be used based on the information.

17. The apparatus of claim 16, wherein the first measurement is a reference signal received power ("RSRP") measurement and the second measurement is a carrier loading measurement.

18. The apparatus of claim 16, wherein the first measurement occurs in a discover signal measurement timing configuration ("DMTC") time window and the second measurement occurs outside of a DMTC time window.

19. A method comprising:

receiving, by use of a receiver, information corresponding to load measurements made by a device, wherein the load measurements comprise:

a first measurement in a first set of subframes at a first time, wherein the first set of subframes comprises at least one subframe, and the first measurement is a power measurement; and a second measurement in a second set of subframes at a second time using a measurement duration for the second measurement, wherein the second set of subframes comprises at least one subframe, and the second measurement is a load measurement;

wherein the second set of subframes is offset in time from the first set of subframes by an offset time, the offset time being determined using a pseudo-random function, the offset time is a first offset time and the measurement duration is a first measurement duration in response to the first measurement being below a threshold, the offset time is a second offset time and the measurement duration is a second measurement duration in response to the first measurement not being below the threshold, the second offset time is shorter than the first offset time, and the first measurement duration is different from the second measurement duration; and determining carriers to be used based on the information.

20. The method of claim 19, wherein the first measurement is a reference signal received power ("RSRP") measurement and the second measurement is a carrier loading measurement.

21. The method of claim 19, wherein the first measurement occurs in a discovery signal measurement timing configuration ("DMTC") time window and the second measurement occurs outside of a DMTC time window.

22. A method comprising:

receiving, by use of a receiver, a discover signal measurement timing configuration ("DMTC") from higher layer signaling;

determining a set of periodic DMTC time windows from the received DMTC, wherein each periodic DMTC time window of the set of periodic DMTC time windows comprises a set of contiguous subframes;

determining a set of carrier loading measurement time windows, wherein each carrier loading measurement time window of the set of carrier loading measurement time windows comprises a set of contiguous subframes; and measuring carrier loading in at least one subframe in each carrier loading measurement time window of the set of carrier loading measurement time windows;

wherein each carrier loading measurement time window of the set of the carrier loading measurement time windows occur immediately adjacent in time to a respective periodic DMTC time window of the set of periodic DMTC time windows, each carrier loading measurement time window does not overlap its respective periodic DMTC time window, an offset time between measurements is a first offset time and a measurement duration for each carrier loading measurement is a first measurement duration in response to a first measurement being below a threshold, the offset time is a second offset time and the measurement duration is a second measurement duration in response to the first measurement not being below the threshold, the second offset time is shorter than the first offset time, the first measurement duration is different from the second measurement duration, and the first measurement is a power measurement.

23. The method of claim 22, comprising measuring at least one of reference signal received power ("RSRP") and reference signal received quality ("RSRQ") in at least one subframe of each periodic DMTC time window of the set of periodic DMTC time windows.

24. The method of claim 22, wherein each carrier loading measurement time window of the set of carrier loading measurement time windows is a periodic carrier loading measurement time window.

25. The method of claim 22, wherein a carrier loading measurement time window periodicity is a multiple of a DMTC time window periodicity.

* * * * *